US010635433B2

(12) United States Patent
Khoongumjorn et al.

(10) Patent No.: US 10,635,433 B2
(45) Date of Patent: Apr. 28, 2020

(54) CROSS APPLICATION BEHAVIOR CUSTOMIZATION

(71) Applicant: General Electric Company, Schenectady, NY (US)

(72) Inventors: Nikun Khoongumjorn, San Ramon, CA (US); Venkata Devarakonda, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/685,068

(22) Filed: Aug. 24, 2017

(65) Prior Publication Data
US 2019/0065177 A1 Feb. 28, 2019

(51) Int. Cl.
*G06F 8/71* (2018.01)
*G06F 9/445* (2018.01)
*G06F 9/54* (2006.01)
*G06F 9/448* (2018.01)

(52) U.S. Cl.
CPC ............ *G06F 8/71* (2013.01); *G06F 9/4488* (2018.02); *G06F 9/44505* (2013.01); *G06F 9/44521* (2013.01); *G06F 9/542* (2013.01); *G06F 9/546* (2013.01)

(58) Field of Classification Search
CPC ... G06F 8/11; G06F 8/71; G06F 9/542; G06F 9/546; G06F 9/4488; G06F 9/44505; G06F 9/44521
See application file for complete search history.

(56) References Cited

U.S. PATENT DOCUMENTS

| | | | |
|---|---|---|---|
| 6,438,594 B1 * | 8/2002 | Bowman-Amuah | G06F 9/4488 709/225 |
| 7,904,899 B2 * | 3/2011 | Robalewski | G06F 9/44505 717/168 |
| 8,706,800 B1 * | 4/2014 | Ahmed | G06F 9/468 709/201 |
| 8,745,617 B1 * | 6/2014 | Stekkelpak | G06F 9/44505 717/173 |
| 9,460,109 B1 * | 10/2016 | Hagerman | G06F 8/71 |
| 2005/0021477 A1 * | 1/2005 | Krishnan | G06F 9/44521 705/64 |

(Continued)

*Primary Examiner* — Ziaul A Chowdhury
(74) *Attorney, Agent, or Firm* — Buckley, Maschoff & Talwalkar LLC (57) ABSTRACT

The example embodiments are directed to an application hub system and method configured to add a tenant-specific script to running instances of a plurality of independently developed software applications thereby customizing the behavior of the plurality of independently developed software applications through a single action. In one example, the method includes receiving a request to load an application hub interface associated with running instances of a plurality of software applications, determining at least one script to be used to customize a behavior of the running instances of the plurality of software applications, adding the at least one script to each of the running instances of the plurality of software applications via the application hub interface, and displaying a user interface associated with the application hub interface which provides access to the customized running instances of the plurality of software applications.

20 Claims, 5 Drawing Sheets (56) References Cited

U.S. PATENT DOCUMENTS

| | | | | |
|---|---|---|---|---|
| 2005/0125810 A1* | 6/2005 | Kline | G06F 9/546 | 719/320 |
| 2009/0007098 A1* | 1/2009 | Chevrette | G06F 8/65 | 717/177 |
| 2010/0146060 A1* | 6/2010 | Graham | A63D 13/10 | 709/206 |
| 2012/0254239 A1* | 10/2012 | Patch | G06F 9/548 | 707/770 |
| 2012/0297016 A1* | 11/2012 | Iyer | G06F 9/5072 | 709/217 |
| 2013/0198763 A1* | 8/2013 | Kunze | G06F 9/542 | 719/318 |
| 2014/0059534 A1* | 2/2014 | Daum | G06F 8/65 | 717/172 |
| 2014/0282397 A1* | 9/2014 | Nielsen | G06F 8/71 | 717/121 |
| 2014/0282399 A1* | 9/2014 | Gorelik | G06F 8/71 | 717/122 |
| 2014/0282610 A1* | 9/2014 | Strom | G06F 21/00 | 719/313 |
| 2014/0282630 A1* | 9/2014 | Charles | G06F 9/44521 | 719/331 |
| 2016/0070813 A1* | 3/2016 | Unter Ecker | G06F 16/986 | 715/234 |
| 2016/0110207 A1* | 4/2016 | Herzi | G06F 9/44505 | 713/1 |
| 2016/0373537 A1* | 12/2016 | Lin | H04L 67/18 | |
| 2017/0123768 A1* | 5/2017 | Liu | G06F 8/60 | |
| 2017/0163631 A1* | 6/2017 | Brucker | H04L 63/0823 | |
| 2018/0260212 A1* | 9/2018 | Wisnovsky | G06F 8/71 | |
| 2018/0322169 A1* | 11/2018 | Kaufman | H04L 69/40 | |

\* cited by examiner

CROSS APPLICATION BEHAVIOR CUSTOMIZATION

BACKGROUND

Machine and equipment assets are engineered to perform particular tasks as part of a process. For example, assets can include, among other things and without limitation, industrial manufacturing equipment on a production line, drilling equipment for use in mining operations, wind turbines that generate electricity on a wind farm, transportation vehicles, and the like. As another example, assets may include devices that aid in diagnosing patients such as imaging devices (e.g., X-ray or MRI systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies, have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

One of the obstacles in designing a computing platform that supports machine and equipment focused software is the wide variety of software that can be of interest for a tenant. For example, a power plant operator may be interested in looking at many software and hardware components related to the plant in order to manage/view various systems, sub-systems, and applications associated therewith, including generators, cooling towers, a plant floor, materials, alerts, fuel usage, power protection, power distribution, control systems, analytics, and/or the like. In order to monitor and control these components, independently developed and distinct applications offered by different vendors and running on different systems are often required. As a result, the operator must access different systems and applications in order to view and interact with the different applications. However, managing the behaviors of these application can be a time-consuming and tedious operation requiring a developer or a tenant to make changes on an application-by-application basis.

SUMMARY

The example embodiments improve upon the prior art by incorporating tenant-specific scripts across a plurality of independently developed software applications through the use of a centralized application hub. Ordinarily, a developer would have to manually modify each software application in order to attempt to effectuate consistent changes across a plurality of microapps, which raises issues with consistency, compatibility and user error. In contrast, the centralized application hub of the example embodiments can load a script or an array of scripts across a plurality of independently developed software applications thereby causing tenant-specific (or in some case user-specific) libraries and other behaviors to be made consistently available across each of the plurality of independently developed software applications. In doing so, a developer can ensure that common behaviors, libraries, or other functions are available across each of a plurality of distinct software applications in an efficient and centralized manner.

According to an aspect of an example embodiment, a method includes one or more of receiving a request to load an application hub interface associated with running instances of a plurality of software applications, determining at least one script to be used to customize a behavior of the running instances of the plurality of software applications, adding the at least one script to each of the running instances of the plurality of software applications via the application hub interface, and displaying a user interface associated with the application hub interface which provides access to the customized running instances of the plurality of software applications.

According to an aspect of another example embodiment, a computing system includes one or more of a memory storing one or more software modules, and a processor configured to execute the one or more software modules. When executed, the one or more software modules cause the processor to receive a request to load an application hub interface associated with running instances of a plurality of software applications, determine at least one script to be used to customize a behavior of the running instances of the plurality of software applications, add the at least one script to each of the running instances of the plurality of software applications via the application hub interface, and display a user interface associated with the application hub interface which provides access to the customized running instances of the plurality of software applications Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a system and method which facilitate multi-application customization through a central hub script or theming setting. The central hub is referred to herein as an application hub and it provides a user or a group of users (also referred to as a tenant) with access to running instances of multiple independently developed software applications through a common user interface. The application hub itself may also be an instance and may be hosted by a cloud-based platform that is designed for building and operating industrial-based applications for the Industrial Internet. In some examples, the cloud platform may be built on Cloud Foundry, and may be further optimized for secure connectivity and analytics for a network of systems and software between the cloud platform and an edge thereof.

The cloud platform may store and provide access to different applications developed by different and distinct vendors. The applications (also referred to as microapps) may be independently developed by different vendors and may be used to analyze, control, or otherwise interact with industrial and healthcare based systems including machine and equipment assets. A tenant or a user group may be authorized to use a subset of these applications. The application hub may be tenant-specific and may encapsulate running instances of the subset of applications authorized for use by the tenant. The application hub may include a wrapper or a shell that provides a unified interface enabling secure access to the running instances of the subset of applications. The application hub may perform authentication on behalf of the tenant with each of the subset of applications, provide common look and feel, may further provide a global navigation menu that allows a user to easily and efficiently navigate between the subset of applications running on the cloud platform and may provide other common features to unify the subset of applications as required.

To provide customized behaviors that cross over to different independently developed microapps, the app hub user interface may incorporate tenant-specific scripts (e.g., JavaScript, etc.) across the running instances of the microapps via the centralized application hub. Ordinarily, a developer would have to manually modify each software application in order to effectuate consistent changes across a plurality of software application. In contrast, the application hub is centralized and can load a script or an array of scripts based through a configuration setting thereof. The script may be provided from a tenant-specific configuration file that the application hub accesses during loading of the application hub user interface. During the loading process, the application hub may determine whether the tenant has any customized scripts and implement the scripts across a plurality of independently developed microapps thereby causing tenant specific libraries and other behaviors to be made consistently available across each of the microapps. In doing so, a developer can ensure that certain behaviors and functions are available within each of a plurality of distinct software applications through the central setting of the application hub and without having to manually modify each software application.

The way the architecture works, it doesn't necessarily have to return a common set of scripts and themes for all users that are part of the tenant. Here, the tenant may specify a configuration server, but the server could return different scripts (or themes as further discussed below) based on a user of the tenancy that is requesting the scripts and themes, as well. For example, different users could be selected to have different themes and/or different scripts and libraries. For example, an admin user may have a different set of scripts than a non-admin user that are part of a same tenancy, and the like. Accordingly, customization of the behaviors of microapps can be modified on a per-user basis within a group of users that make up the tenant.

As another example, the application hub user interface may incorporate a custom theme across both a display of the application hub user interface and the display of the running instances of a plurality of independently developed software applications. The customized theme may be provided from another global or central setting included within the application hub and may be provided from the tenant-specific configuration file that the application hub accesses during loading of the application hub user interface. By implementing a custom theme across the plurality of independently developed software applications through the central hub, the tenant is able to establish a common look and feel to each of the distinct software applications thereby simplifying and improving the user experience. For example, through the theming, the tenant can modify how menus are displayed (e.g., top-down, etc.), colors, logos, backgrounds, and the like, of the user interface and the running instances of the microapps.

In an industrial or other computing environment, independent developed software applications may be stored in a cloud platform and may be hosted by different and distinct vendors and/or have different subsets of users authorized for use thereof. As a result, each application may require its own distinct authentication process. The application hub may perform an authentication process on behalf of a tenant/user and provide authentication information of the user when the user navigates to the applications via the application hub user interface. For example, an identity provider (e.g., a UAA) that communicates with the application hub may authenticate a user. In this example, when an unauthenticated user attempts to access the application hub, the application hub can redirect the user to the identity provider to verify the user. When the identity of the user is verified, the identity provider may return the user back to the application hub, and in response, the application hub may retrieve a token corresponding to the user from a secure storage (e.g., a Redis server). The token may be used to access a configuration file that is tenant-specific and which may include information about applications authorized for use by the user/tenant, and the like. The token may not be exposed to the user but may remain hidden between the application hub, the secure server, and the applications. The token may also be stored by the application hub for future reference.

A request for navigating to an application may be submitted by an authenticated user through the application hub. In response, the application hub may attach that token to the request (i.e., in a header) and transmit the request along with the token to the running instance of the application (e.g., such as a host device of the application). Each application may expect to receive the token of the authenticated user during an access request, and may deny service to any request that does not include the token. Furthermore, the token server may control how and when the user is logged out of the application hub. For example, the token server may set an expiry for a token (e.g., 12 hours). Furthermore, each subsequent authentication process between the user and another application or microapp may be performed by the application hub without requiring user interaction during the authentication process. Accordingly, the application hub may act as a central authority for authenticating a user with many different applications and/or vendors. In the examples provided herein, a UAA is used for authenticating the user, but a different login mechanism could be used, for example, Twitter, Facebook, or any other means of authentication.

While progress with industrial and machine automation has been made over the last several decades, and assets have become 'smarter,' the intelligence of any individual asset pales in comparison to intelligence that can be gained when multiple smart devices are connected together, for example, in the cloud. Aggregating data collected from or about multiple assets can enable users to improve business processes, for example by improving effectiveness of asset maintenance or improving operational performance if appropriate industrial-specific data collection and modeling technology is developed and applied.

Assets can be outfitted with one or more sensors configured to monitor respective operations or conditions. Data from the sensors can be recorded or transmitted to a cloud-based or other remote computing environment. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, enhanced software algorithms for operating the same or similar assets, better operating efficiency, and the like.

The application hub may be used in conjunction with applications for managing machine and equipment assets and can be hosted within an Industrial Internet of Things (IIoT). In an example, an IIoT connects assets, such as turbines, jet engines, locomotives, healthcare devices, and the like, to the Internet or cloud, or to each other in some meaningful way such as through one or more networks. The central application hub described herein can be implemented within a "cloud" or remote or distributed computing resource. The cloud can be used to receive, relay, transmit, store, analyze, or otherwise process information for or about assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of machine and equipment assets with the remote computing resources to enable the IIoT often presents technical challenges separate and distinct from the specific industry and from computer networks, generally. A given asset may need to be configured with novel interfaces and communication protocols to send and receive data to and from distributed computing resources. Given assets may have strict requirements for cost, weight, security, performance, signal interference, and the like such that enabling such an interface is rarely as simple as combining the asset with a general-purpose computing device. To address these problems and other problems resulting from the intersection of certain industrial fields and the IIoT, the example embodiments provide an application hub user interface for facilitating communication with and configuration of assets via remote computing platforms and frameworks.

The Predix™ platform available from GE is a novel embodiment of such an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial or healthcare based assets can be uniquely situated to leverage its understanding of assets themselves, models of such assets, and industrial operations or applications of such assets, to create new value for industrial customers through asset insights.

Figure 1:
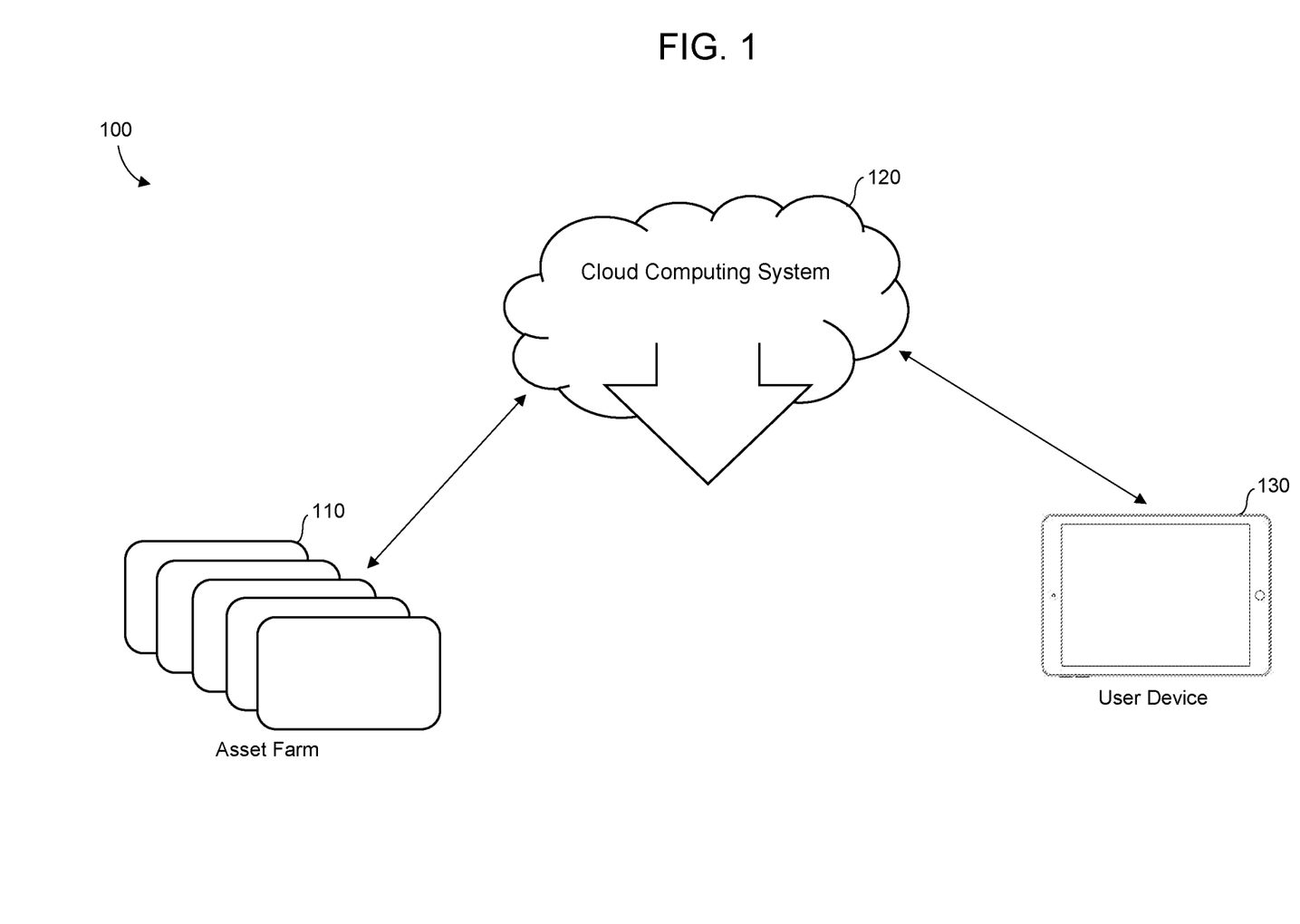
FIG. 1 is a diagram illustrating a cloud computing environment associated with an application hub in accordance with an example embodiment.

FIG. 1 illustrates a cloud computing environment 100 associated with industrial systems in accordance with an example embodiment. Referring to FIG. 1, the cloud computing environment 100 includes an asset farm 110 which may be a group of assets (e.g., hardware, software, etc.) for use in manufacturing and industry. The environment 100 further includes a cloud computing system 120 and one or more user devices 130. An asset management platform (AMP) can reside in cloud computing system 120, in a local or sandboxed environment, or can be distributed across multiple locations or devices and can be used to interact with assets 110. The AMP can be configured to perform any one or more of data acquisition, data analysis, or data exchange with local or remote assets 110, or with other task-specific processing devices. The AMP may be connected to an asset community 110 (e.g., turbines, healthcare, power, industrial, manufacturing, etc.) that is communicatively coupled with the cloud computing system 120. Also, the cloud computing system 120 may include several layers, for example, a data infrastructure layer, a cloud foundry layer, and modules for providing various functions.

The user device 130 (e.g., smart phone, workstation, tablet, appliance, kiosk, and the like) may display a centralized application hub user interface described herein which can be configured for data communication with the cloud computing system 120. The user device 130 can be used to monitor or control one or more assets 110, for example, via the application hub user interface. In an example, information about the asset community 110 may be presented to an operator at the user device 130 from the cloud computing system 120. For example, the user device 130 can include options for optimizing one or more members of the asset community 110 based on analytics performed at the cloud computing system 120.

In some embodiments, the cloud computing system 120 may include a local, system, enterprise, or global computing infrastructure that can be optimized for industrial data workloads, secure data communication, and compliance with regulatory requirements. The cloud computing system 120 can include services that developers can use to build or test Industrial Internet applications, and services to implement Industrial Internet applications. For example, the cloud computing system 120 may host a microservices marketplace where developers can publish their distinct services and/or retrieve services from third parties. In addition, the cloud computing system 120 can host a development framework for communicating with various available services or modules. The development framework can offer distinct developers a consistent contextual user experience in web or mobile applications. Developers can add and make accessible their applications (services, data, analytics, etc.) via the cloud computing system 120.

Information from an asset 110, about the asset 110, or sensed by an asset 110 itself may be communicated from the asset 110 to the cloud computing system 120. In an example, an external sensor can be used to sense information about a function of an asset 110, or to sense information about an environment condition at or near an asset. The external sensor can be configured for data communication with the cloud computing system 120 which can be configured to use the sensor information in its analysis of one or more assets. Furthermore, an operation of the one or more assets 110 may be enhanced or otherwise controlled by the cloud computing system 120 and/or the user device 130.

The cloud computing system 120 may include a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation. In addition, the cloud computing system 120 may be based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The cloud computing system 120 can include a data services module that can facilitate application development. For example, the data services module can enable developers to bring data into the cloud computing system 120 and to make such data available for various applications, such as applications that execute at the cloud, at a machine module, or at an asset or other location. In an example, the data services module can be configured to cleanse, merge, or map data before ultimately storing it in an appropriate data store, for example, at the cloud computing system 120.

Figure 2:
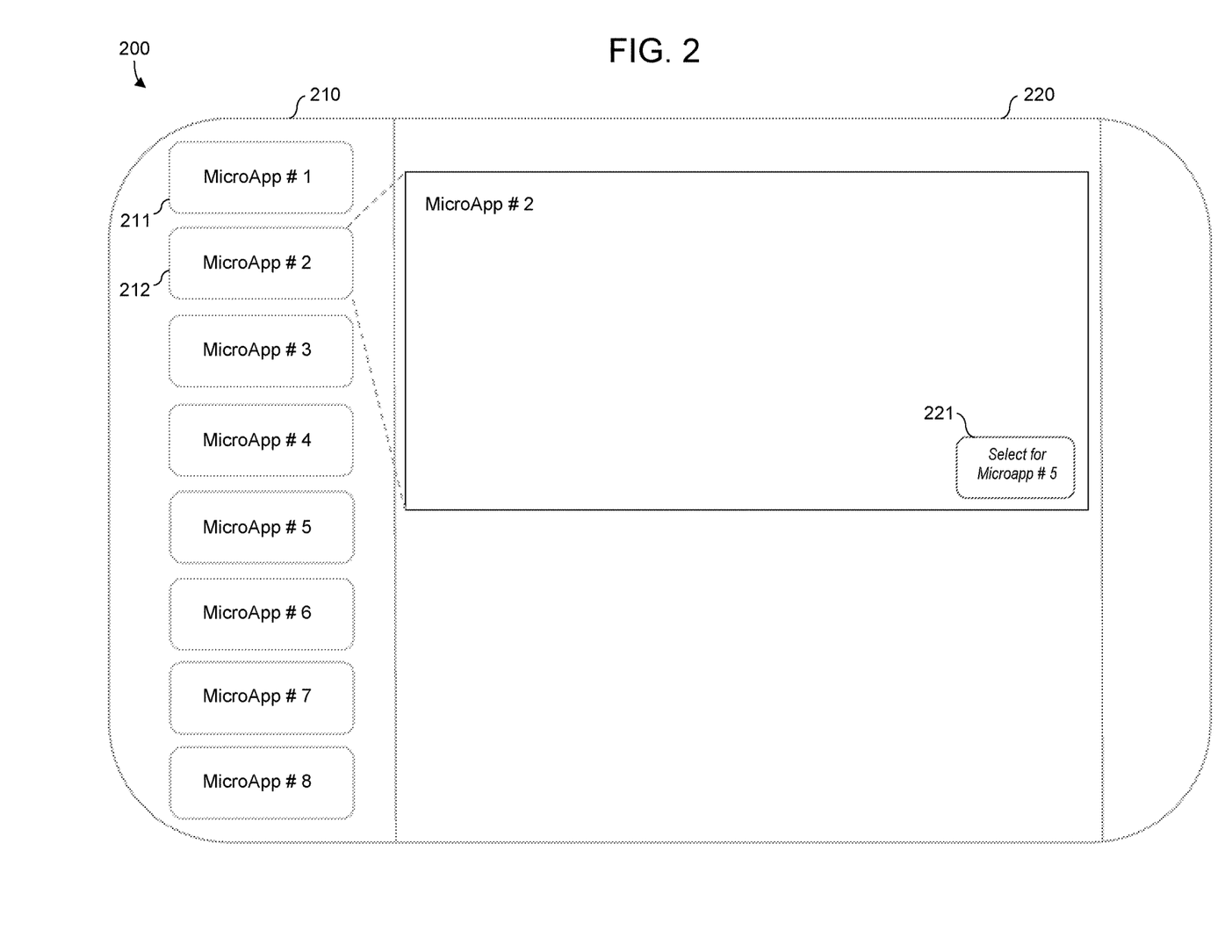
FIG. 2 is a diagram illustrating an application hub user interface in accordance with an example embodiment.

FIG. 2 illustrates an application hub user interface 200 in accordance with an example embodiment. For example, software for controlling and managing an instance of the application hub user interface 200 may be deployed on the cloud computing system 120 and accessed by user device 130 shown in FIG. 1. Referring to FIG. 2, during an initial sign-on session, a user may be prompted to enter authentication information such as username, password, security credentials, and the like. Here, the sign-on session may be performed by an identity provider mechanism in the background of the application hub user interface 200. The user may be redirected to the identity provider and once authenticated, the user may be returned to the application hub user interface 200. As another example, the authentication process may take place via the application hub user interface 200. Once authenticated, the application hub user interface 200 may be displayed to a user on the user's device. Here, a plurality of microapps are each represented by a plurality of navigation options (e.g., microapp #1 is represented by navigation option 211, microapp #2 is represented by navigation option 212, etc.) included in a navigation menu 210 that is positioned within the application hub user interface 200.

The instance of the application hub may identify a plurality of microapps (e.g., microapps 1-8) on the cloud platform authorized for use by the user and request location information of the plurality of applications from the cloud platform. For example, the requests may be provided to and processed by a configuration service of the application hub and the location information may include a path in the cloud platform associated with a running instance of a microapp. In response, the application hub may receive navigation information for each of the plurality of applications from the microapps residing within the cloud platform. The navigation information for each microapp may include location information of a running instance of the microapp within the cloud platform. For example, the location may include a URL or other address information of the microapp host. The application hub may generate the navigation menu 210 including the plurality of navigation options based on the received navigation information. In this example, each navigation option, when selected, is configured to navigate to a running instance of a respective application.

In addition, the configuration service may also provide customized behavior information and/or customized script information for the user. For example, the configuration service may provide the application hub with a URL or other location of tenant-specific scripts (e.g., JavaScript), libraries, etc., which are to be added to the plurality of microapps to customize a behavior thereof. The configuration service may also provide customized theming information for the user. For example, the configuration service may provide the application hub with a URL or other location of tenant-specific theming data which can be added to the display of the application hub user interface and the individual microapps to customize a look and feel of the application hub user interface.

For multiple microapps to integrate well in a single application hub it is beneficial for the user to be able to navigate between the microapps. There are multiple ways in which a user may navigate between microapps, and they include, the user selecting a link/navigation option in the global navigation menu, the user clicking a link/option within a microapp which links directly to a location in another microapp, the user taking an action in one microapp, the end result of which redirects the user to a location in another microapp, and the like. The global navigation menu is composed by the application hub configuration service by asking each microapp for its navigation links and combining the result into a coherent whole. Each application is only responsible for its own navigation.

In FIG. 2, microapp #2 corresponding to navigation option 212 is currently selected and displayed via display window 220 which provides a viewing area for running instances of open microapps. For example, the display of the running instance of microapp #2 may include analytical data or other information. In addition to displayed data, microapp #2 may have a navigation option 221 which navigates to microapp #5 or some other event that can trigger microapp #5. Here, the user may select navigation option 221 embedded within the display of the running instance of microapp #2. In response, the application hub may close a view of the running instance of microapp #2 in the display window 220 and open a display of a running instance of microapp #5 in the display window 220. Accordingly, the application hub user interface may navigate between running instances of microapps with a simple click of a button or selection of an option.

According to various embodiments, any individual microapp instance may be included in multiple application hubs, and each of those application hubs may be composed of a different set of microapps. Therefore, a developer that wishes to link to another microapp needs to determine whether that other microapp is present in that application hub, and what URL to use for the link. An application hub provides a mechanism to accomplish this. When the user's browser loads a page from the application hub, that page may contain a JavaScript object with a "routes" attribute, mapping every microapp's ID to its path in that application hub. For example:

```
"routes": {
  "ma1": "/cases",
  "ma2": "/alerts"
}
```

In this example, a developer working on the "ma1" microapp that wants to provide a link to the "ma2" microapp may examine the routes object to determine if the "ma2" microapp is present, and prepend the value of the "ma2" route (/alerts) to their link in order to link the two microapps.

Figure 3:
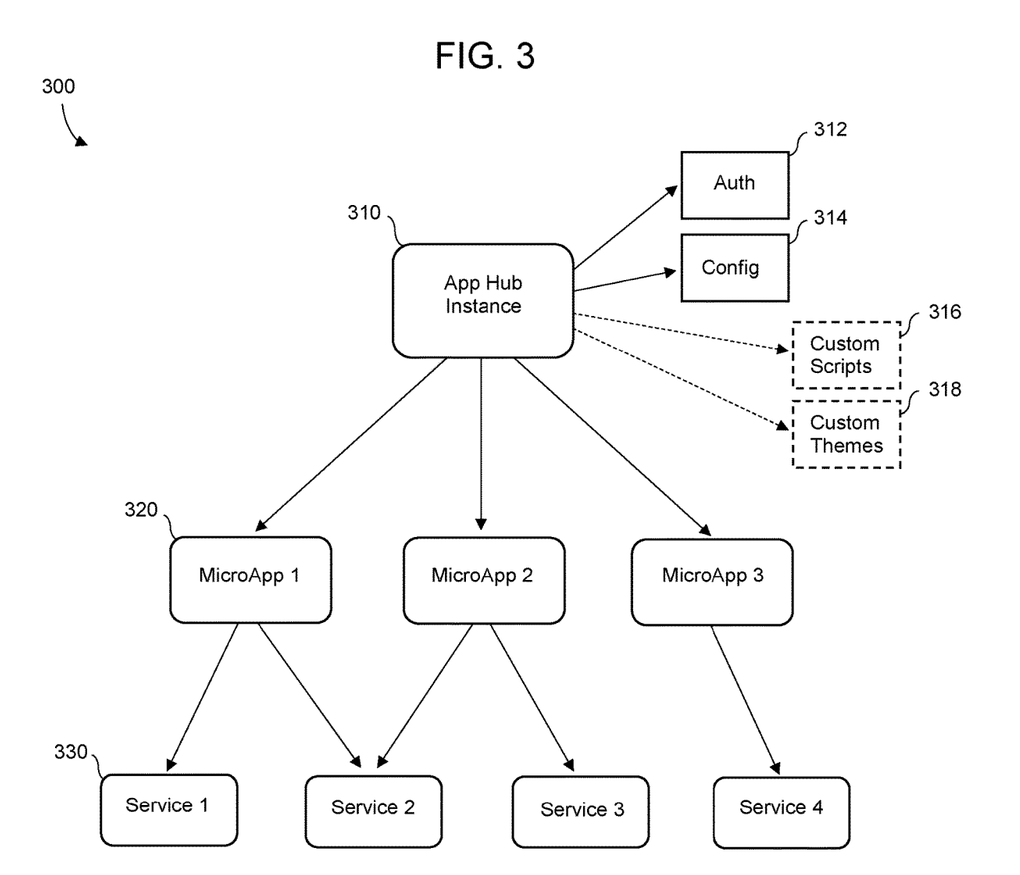
FIG. 3 is a diagram illustrating an application hub architecture in accordance with example embodiments.

FIG. 3 illustrates an application hub architecture 300 in accordance with an example embodiment. In this example, a user device establishes connection with an application hub instance 310 which could be hosted by the cloud computing system 120 shown in FIG. 1, or another host device or server. Referring to FIG. 3, the architecture 300 includes an app hub layer 310, a microapps layer 320, and a microservices layer 330. It should be appreciated that this architecture 300 is merely an example, and may include additional or different layers. The hub layer includes instances of application hubs which each have a respective address (e.g., a URL) within a cloud or other type computing environment. In this example, a first running instance of an application hub 310 has a first address. The microapps layer includes instances of running software applications (microapps) which may be accessed by the instance of the application hub 310 running in the app hub layer. Similar to the application hub, a running instance of a microapp 320 may also have an address associated therewith. For example, a microapp address may be based on the path address of a corresponding application hub and a path of the respective microapp. Furthermore, each microapp may access one or more services 330 in the microservices layer. The services also include an address associated therewith which may be based on the path address of a corresponding application hub and microapp along the path to the respective service.

An instance of an application hub may be access by multiple users which each have access to their own respective set of microapps. Here, the microapps may be distinct software applications developed independently from one another by different vendors. The application hub instance 310 may encapsulate running instances of a group or a set of microapps which a particular user has access. To determine which microapps (e.g., a subset of microapps) which the user may access, during a login process, a user is redirected from the application hub 310 to the identity provider service module 312 for an authentication process. The identity provider service module 312 may be a User Account and Authentication (UAA) server for Cloud Foundry. The UAA server may issue tokens for applications included within the cloud platform. As another example, the identity provider service module may be another type of identity provider/verifier such as Facebook, Twitter, or the like.

The identity provider service module 312 may provide the user with a login page, and the user may enter their information and transmit the login information to the identity provider service module 312. The identity provider service module 312 may authenticate the user for the application hub based on the input login information and provide notice of successful login to the application hub instance 310. The application hub 310 may retrieve a token corresponding to the user from a database module such as an open source Redis data structure storage and access service. The configuration services module 314 receives the users token from the application hub 310, and in response, returns the names of all applications authorized for use by the user, navigation hierarchy information for the applications, and other details for that user. The configuration services module 314 may query individual microapps to retrieve their navigation information. This navigation information is used to generate the navigation menu of the application hub user interface. Also, one or more sub-navigation menus may be generated based on the navigation menu and various services within each microapp.

Furthermore, according to various embodiments, the configuration service 314 may also provide the application hub instance 310 with a location (e.g., a URL, URI, address, etc.) which identifies custom scripts 316 (e.g., JavaScript, code, libraries, etc.) which the can be used by the app hub instance 310 to customize a behavior of the microapps 320 authorized for use by the user/tenant. For example, the custom scripts 316 may be a JavaScript code embedded within an HTML file or page at a URL such that it is accessible by the app hub instance 310 via a public or private network. Here, the app hub instance 310 may acquire the custom script or an array of custom scripts by checking for the URL in the configuration service 314 and apply the custom script to running instances of the microapps 320 which are displayed via an application hub user interface of the app hub instance 310. If, however, the custom script is not included in the configuration service 314, the app hub instance 310 may load standard scripts and behavior for the microapps 320.

According to various embodiments, the custom scripts 316 may include a tenant-specific library which the app hub instance 310 can make available across each of the running instances of the microapps 320. In some embodiments, the microapps 320 may be independently developed software applications developed by different vendors. Therefore, the custom script 316 may enable the running instances of the plurality of independently developed software applications to communicate with each other via a notification platform. In addition to custom scripts, or instead of custom scripts, the app hub instance 310 may implement standard scripts used for all tenants of the app hub into the microapps 320. The scripts may be implemented within the microapps while they are running within the application hub user interface.

As another example, the configuration service 314 may provide the app hub instance 310 with a location (e.g., a URL, URI, etc.) of custom theming 318 to be used for customizing a look and a feel of the microapps 320 and the user interface of the app hub instance 310. Here the application hub user interface may be defined by several files (e.g., JavaScript, handlebar, etc.), which are loaded during startup. During a loading of a non-customized app hub user interface, the app hub instance 310 may load a standard handlebar file for all tenants and tenant users that contains the standard logic and styling used for displaying and navigating between microapps from the custom theming 318. However, the example embodiments provide theming features which enables developers to specify a different handlebars file for customized theming. Rather than requiring a user to manually manipulate the style from within a microapp, or loading CSS classes that override standard files used by the app hub instance 310, the developer may provide an address within the configuration service 314 that provides their own complete user interface definition for styling included at a theming file 318 which is accessible via a URL or other address. They can start with the reference and go from modifying colors and logos etc. to providing a completely different interface. Here, instead of loading fixed handlebars file for all tenants, a check is performed by the app hub instance 310 within the configuration service 314 and a remotely hosted handlebars file may be loaded instead (if specified).

The composability of the application hub allows the microapps 320 to be designed with different programming languages and libraries. Each application hub may have a configuration service that controls and manages navigation information between the application hub, the microapps, and the services. When a product owner adds a microapp to an application hub, they are adding a pointer to a configuration service of the application hub. Here, the pointer points to a running instance of the microapp. For example, when a user logs into the application hub instance, the following may occur:

1) a configuration service of a corresponding application hub queries a list of microapps authorized for use by that particular user;
2) the configuration service queries sub-navigation items of each of the microapps for their navigation information, combines the navigation information from the sub-navigation items into a single object, and returns that object to the application hub;
3) the application hub requests the content template (e.g., custom scripts and/or standard scripts) from the current microapp (determined by the URL path, or a default if no path was specified in the request), wraps the template in its own markup, along with the combined navigation information retrieved in the previous step, and returns the document to the user's web browser;
4) the application hub request any custom scripts to be used to modify the behavior of microapps accessible by the user; and
5) the application hub establishes a reverse proxy from the microapp's path to the running instance, allowing further requests to be handled by the microapp itself.

According to various embodiments, by querying the microapps for their navigation information, the configuration service can detect a location of each microapp within the cloud computing environment. Furthermore, when the user interface is generated, the navigation information may be included as links or options in a global navigation menu that can be selected by a user via the user interface. In response to selecting a navigation link or option, the user interface may access a running instance of a corresponding microapp associated with the navigation link and display the running instance via the user interface.

Because an application hub is composed of running microapp instances, any particular microapp may be used by multiple application hubs, at once. Furthermore, if that microapp is redeployed, all application hubs which contain it will immediately reflect any new features or fixes. Furthermore, an application hub provides composability to the microapps associated therewith. As projects grow in complexity, they may be split into separate microapps thus keeping codebases small, and improving refactorability and testability. In this example, a plurality of microapps may be related with each other and operate together as a whole with a common navigation between them. Furthermore, only one microapp may be loaded into the browser at a time, and as a result, the application hub user interface performance may also be improved over a monolithic application.

As a result of the composability offered by the application hub, development teams are no longer necessarily bound to an application framework or set of dependencies and they are free to use the user interface technologies which meet their needs. Each microapp may be developed using its own technologies, independent from other microapps included in the same application hub. In some cases, the different technologies may be different programming languages. As another example, the different technologies may be the same programming language but a different JavaScript library or a different framework instead of a different programming language. In addition, existing applications can be easily modified to work in an application hub environment. Development teams are no longer necessarily tied to a common release schedule and they are free to deploy and scale their applications independently. Furthermore, creating an application hub is simple, and a product owner may create as many as they like. Composability allows for creative thinking and experimentation when it comes to the design of software products.

Figure 4:
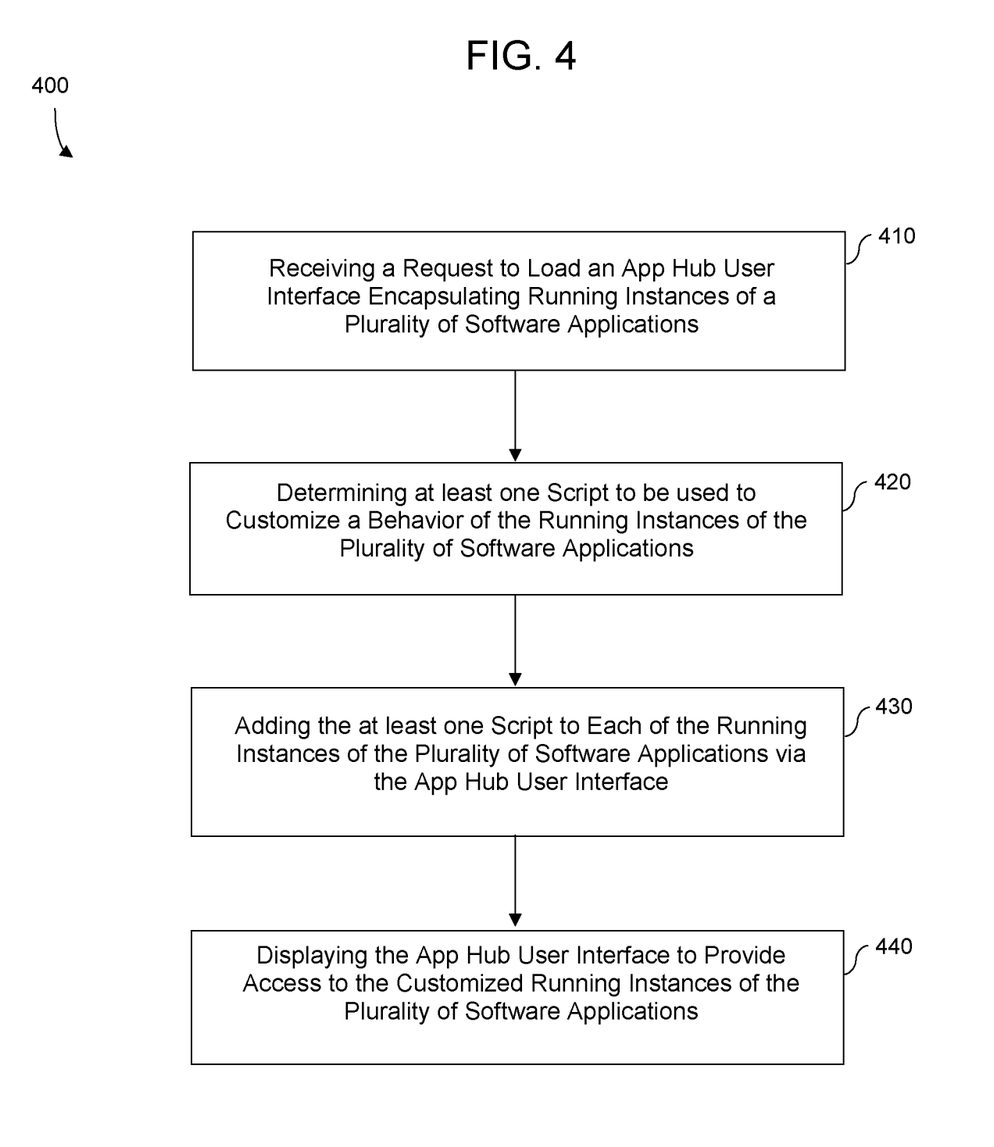
FIG. 4 is a diagram illustrating a method for customizing a plurality of applications via an application hub interface in accordance with an example embodiment.

FIG. 4 illustrates a method 400 for customizing a plurality of applications via an application hub interface in accordance with an example embodiment. For example, the method 400 may be performed by an application hub hosted by a cloud computing system 120 shown in FIG. 1, a server, a database, or the like. Referring to FIG. 4, in 410 the method includes receiving a request to load an application hub user interface associated with running instances of a plurality of software applications. For example, the request may be received from a tenant (e.g., a developer or other user). The request may be an initial request to load a display of the application hub user interface on a screen of a computing device of the user. The request may be received by an application hub instance executing on a host device. The application hub instance may authenticate the user prior, during, or after receiving the request in 410. In response to authenticating the user, the application hub instance may access a configuration file that is tenant specific and which includes a location (e.g., an address, a URL, etc.) where tenant-specific behavior customization information such as customized scripts, libraries, themes, and the like, are stored. The configuration file may also include tenant-specific theming customization information for customizing a look and feel of the running instances of the plurality of applications.

In 420, the method includes determining at least one script to be used to provide a common library to or to customize a behavior of the running instances of the plurality of software applications. For example, the script may be acquired from the location included in the tenant-specific behavior customization information. Here, the acquiring may include identifying a script or an array of scripts from the tenant-specific behavior customization information included in a file such as a JavaScript file, or the like, accessed at the address provided for, and which are to be used to customize a behavior of a plurality of distinct microapps accessible to the tenant. In some embodiments, the behavior customization information may be added by a developer of the tenant during an initial development of the application hub instance. As another example, the behavior customization information may be entered by a developer through a separate user interface during development of the application hub instance. For example, the developer may add the URL to configuration code of the application hub instance, it may enter the URL through a field of the separate user interface, and the like.

In some embodiments, the running instances of the plurality of software applications include running instances of a plurality of independently developed software applications developed by different and distinct vendors. In this example, the at least one script may include a tenant-specific library that can be made available across the running instances of the distinct software applications which the tenant is authorized to access. For example, the at least one script may enable the running instances of the plurality of independently developed and distinct software applications to communicate with each other via a common notification platform.

In 430, the method further includes adding the at least one script to each of the running instances of the plurality of software applications via the application hub user interface, and, in 440, displaying the application hub user interface which provides access to the customized running instances of the plurality of software applications. For example, the adding may cause a tenant-specific library to be made available across each of the running instances of the plurality of software applications. In some embodiments, the adding may include adding the at least one customized script provided by the tenant and a plurality of other predefined scripts that are standard for all tenants of the application hub user interface to the running instances of the plurality of software applications. In some embodiments, the adding may include simultaneously incorporating at least one customized script into the running instances of each of the plurality of software applications via the application hub user interface. Although not shown in FIG. 4, the method may further include determining an alternate user interface (or theme) to be used which provides a new look or a modified look of the running instances of the plurality of software applications, and applying that user interface to the running instances of the plurality of software applications via the application hub user interface.

Figure 5:
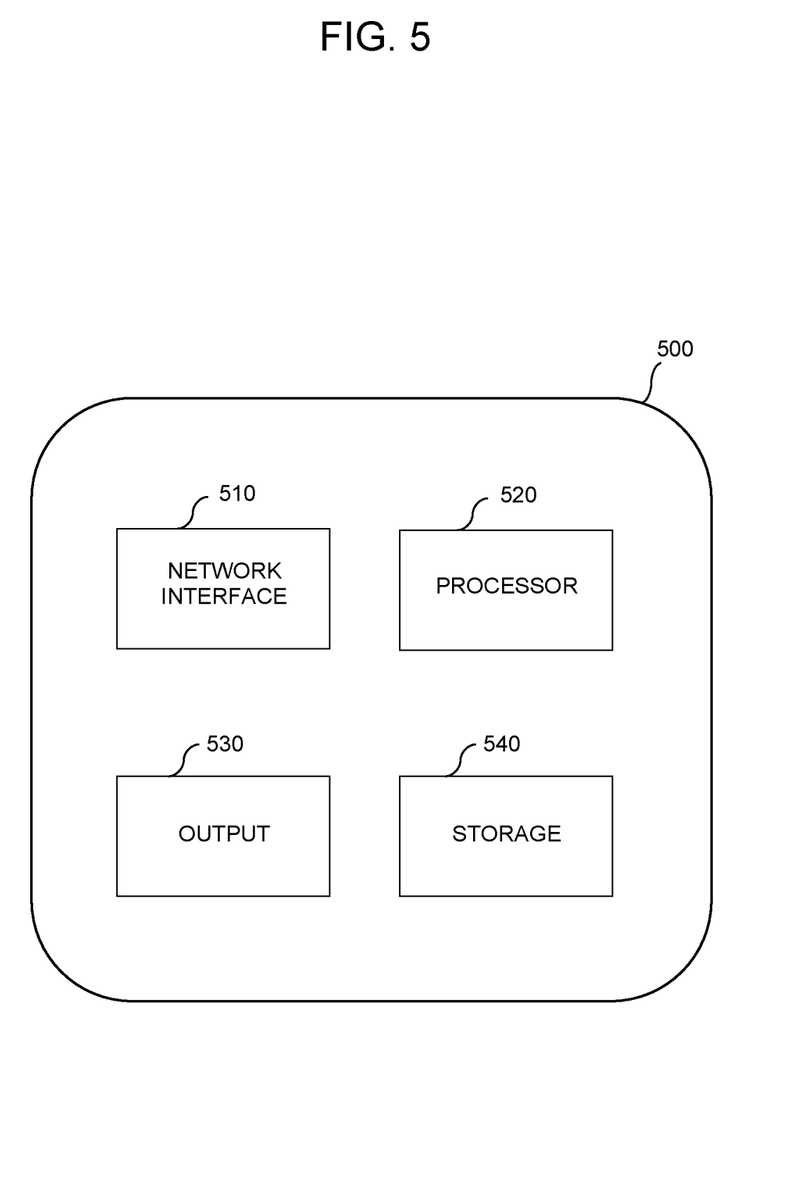
FIG. 5 is a diagram illustrating a computing system for customizing a plurality of applications via an application hub interface in accordance with an example embodiment.

FIG. 5 illustrates a computing system 500 for customizing a plurality of applications via an application hub interface in accordance with an example embodiment. For example, the computing system 500 may be the cloud computing system 120 or an instance thereof, shown in FIG. 1, a database connected to the cloud, a user device connected to the cloud, or another type of device. Also, the computing system 500 may perform the method 400 of FIG. 4. Referring to FIG. 5, the computing system 500 includes a network interface 510, a processor 520, an output 530, and a storage device 540 such as a memory. Although not shown in FIG. 5, the computing system 500 may include other components such as a display, an input unit, a receiver/transmitter, and the like.

The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the computing system 500, an externally connected display, a display connected to the cloud, another device, and the like. The storage device 540 is not limited to a particular storage device and may include any known memory device such as RAM, ROM, hard disk, and the like, and may or may not be included within the cloud environment.

The storage 540 may store one or more software modules for executing the method 400 of FIG. 4, and the software modules may be executed by the processor 520. According to various embodiments, the processor 520 may receive a request to load an application hub user interface associated with running instances of a plurality of software applications. The request may be received from a tenant (e.g., user or developer). The processor 520 may authenticate the user via an authentication protocol and determine tenant-specific configuration settings for the user based on information provided during the authentication. For example, the authentication may provide the application hub instance with access to a configuration file that is tenant-specific and which includes addresses or other settings of customized scripts which may be used to customize or otherwise modify a behavior of a plurality of microapps, and customized themes which may be used to customize a look and feel of the plurality of microapps.

The processor 520 may determine at least one script to be used to customize a behavior of the running instances of the plurality of software applications. For example, the processor 520 may determine the at least one script to be used based on tenant-specific configuration information included in a file that is associated with the tenant and that is accessed by the application hub. The at least one script may include a tenant-specific library, and the adding by the processor 520 may cause the tenant-specific library to be made available across each of the running instances of the plurality of software applications. Here, the running instances of the plurality of software applications may include running instances of a plurality of independently developed and distinct software applications developed by different vendors. As one example, the at least one customized script may enable the running instances of the plurality of independently developed software applications to communicate with each other via a common notification platform.

The processor 520 may add the at least one script to each of the running instances of the plurality of software applications via the application hub user interface, and the output 530 may display the application hub user interface on a client device which provides access to the customized running instances of the plurality of software applications. For example, the processor 520 may add the at least one script in combination with a plurality of other standard predefined scripts of the application hub user interface which are common to all tenants to the running instances of the plurality of software applications. In some embodiments, the processor 520 may simultaneously incorporate the at least one script into the running instances of each of the plurality of software applications via the application hub user interface. In some embodiments, the processor 520 is further configured to determine at least one theme to be used to customize a look of the running instances of the plurality of software applications, and add the at least one theme to the running instances of the plurality of software applications via the application hub user interface.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/ machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method comprising:
    receiving a request to load an application hub interface associated with a user;
    identifying a plurality of software applications that the user has been previously authorized to use, and querying respective running instances of the plurality of software applications which are already running on a host platform for navigation locations of the respective running instances of the plurality of software applications;
    receiving navigation information of the plurality of software applications from microapps residing in a cloud platform, the navigation information for each microapp including location information of a running instance of the microapp within the cloud platform;
    determining at least one script to be used to customize a behavior of the running instances of the plurality of software applications when interacted with via the application hub interface;
    adding the at least one script to each of the running instances of the plurality of software applications via the application hub interface; and
    displaying the application hub interface including a navigation menu comprising links to the navigation information of the customized running instances of the plurality of software applications received from the microapps, wherein, when selected, each link causes a corresponding running instance of a software application from among the plurality of software applications to be loaded into a viewing area of the application hub interface.

2. The method of claim 1, wherein the determining comprises determining the at least one script to be used based on tenant-specific configuration information included in a file that is associated with the tenant.

3. The method of claim 1, wherein the at least one script comprises a tenant-specific library, and the adding of the at least one script causes the tenant-specific library to be made available across each of the running instances of the plurality of software applications.

4. The method of claim 1, wherein the running instances of the plurality of software applications comprise running instances of a plurality of independently developed software applications developed by different vendors.

5. The method of claim 4, wherein the at least one script enables the running instances of the plurality of independently developed software applications to communicate with each other via a notification platform.

6. The method of claim 1, wherein the adding comprises adding the at least one script and a plurality of other predefined scripts of the application hub user interface to the running instances of the plurality of software applications.

7. The method of claim 1, wherein the adding comprises simultaneously incorporating the at least one script into the running instances of each of the plurality of software applications via the application hub user interface.

8. The method of claim 1, wherein the method further comprises determining at least one theme to be used to customize a look of the running instances of the plurality of software applications, and changing a display of the user interface based on the at least one theme.

9. A computing system comprising:
    a memory storing one or more software modules; and
    a processor configured to execute the one or more software modules, wherein when executed, the one or more executed software modules cause the processor to:
    receive a request to load an application hub interface associated with a user;
    identify a plurality of software applications that the user has been previously authorized to use, and query respective running instances of the plurality of software applications which are already running on a host platform for navigation locations of the respective running instances of the plurality of software applications;
    receive navigation information of the plurality of software applications from microapps residing in a cloud platform, the navigation information for each microapp including location information of a running instance of the microapp within the cloud platform;
    determine at least one script to be used to customize a behavior of the running instances of the plurality of software applications when interacted with via the application hub interface;
    add the at least one script to each of the running instances of the plurality of software applications via the application hub interface; and display the application hub interface including a navigation menu comprising links to the navigation information of the customized running instances of the plurality of software applications received from the microapps, wherein, when selected, each link causes a corresponding running instance of a software application from among the plurality of software applications to be loaded into a viewing area of the application hub interface.

10. The computing system of claim 9, wherein the processor is configured to determine the at least one script to be used based on tenant-specific configuration information included in a file that is associated with the tenant.

11. The computing system of claim 9, wherein the at least one script comprises a tenant-specific library, and the adding of the at least one script by the processor causes the tenant-specific library to be made available across each of the running instances of the plurality of software applications.

12. The computing system of claim 9, wherein the running instances of the plurality of software applications comprise running instances of a plurality of independently developed software applications developed by different vendors.

13. The computing system of claim 12, wherein the at least one script enables the running instances of the plurality of independently developed software applications to communicate with each other via a notification platform.

14. The computing system of claim 9, wherein the processor is configured to add the at least one script and a plurality of other predefined scripts of the application hub user interface to the running instances of the plurality of software applications.

15. The computing system of claim 9, wherein the processor is configured to simultaneously incorporate the at least one script into the running instances of each of the plurality of software applications via the application hub user interface.

16. The computing system of claim 9, wherein the processor is further configured to determine at least one theme to be used to customize a look of the running instances of the plurality of software applications, and change a display of the user interface based on the at least one theme.

17. A non-transitory computer readable medium having stored therein instructions that when executed cause a computer to perform a method for controlling an application hub user interface associated with a cloud platform, the method comprising:

receiving a request to load an application hub interface associated with a user;

identifying a plurality of software applications that the user has been previously authorized to use, and querying respective running instances of the plurality of software applications which are already running on a host platform for navigation locations of the running instances of the plurality of software applications;

receiving navigation information of the plurality of software applications from microapps residing in a cloud platform, the navigation information for each microapp including location information of a running instance of the microapp within the cloud platform;

determining at least one script to be used to customize a behavior of the running instances of the plurality of software applications when interacted with via the application hub interface;

adding the at least one script to each of the running instances of the plurality of software applications via the application hub interface; and displaying the application hub interface including a navigation menu comprising links to the navigation information of the customized running instances of the plurality of software applications received from the microapps, wherein, when selected, each link causes a corresponding running instance of a software application from among the plurality of software applications to be loaded into a viewing area of the application hub interface.

18. The non-transitory computer readable medium of claim 17, wherein the determining comprises determining the at least one script to be used based on tenant-specific configuration information included in a file that is associated with the tenant.

19. The non-transitory computer readable medium of claim 17, wherein the at least one script comprises a tenant-specific library, and the adding of the at least one script causes the tenant-specific library to be made available across each of the running instances of the plurality of software applications.

20. The non-transitory compute readable medium of claim 17, wherein the at least one script enables running instances of a plurality of independently developed software applications to communicate with each other via a notification platform.

* * * * *